April 4, 1939.　　　　　E. GRAY　　　　　2,152,799
ARTICULATED RAILWAY TRUCK
Filed Feb. 8, 1937　　　2 Sheets-Sheet 1
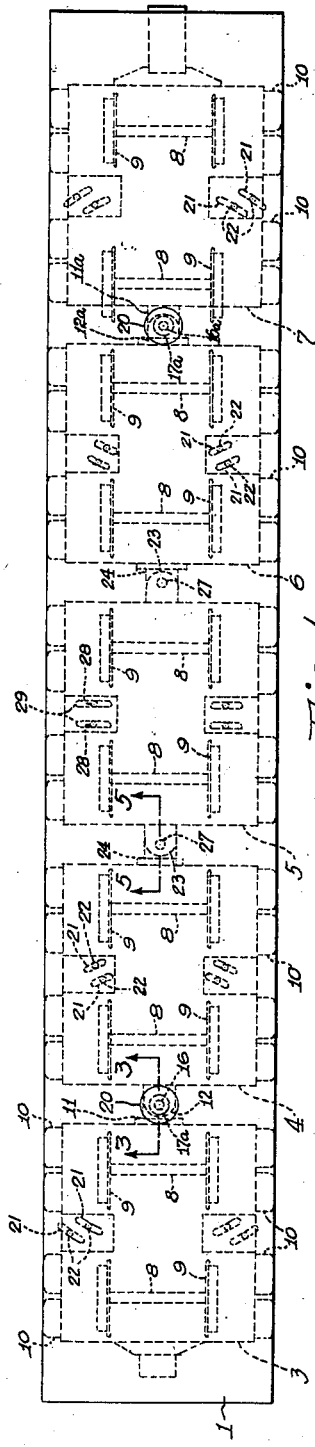
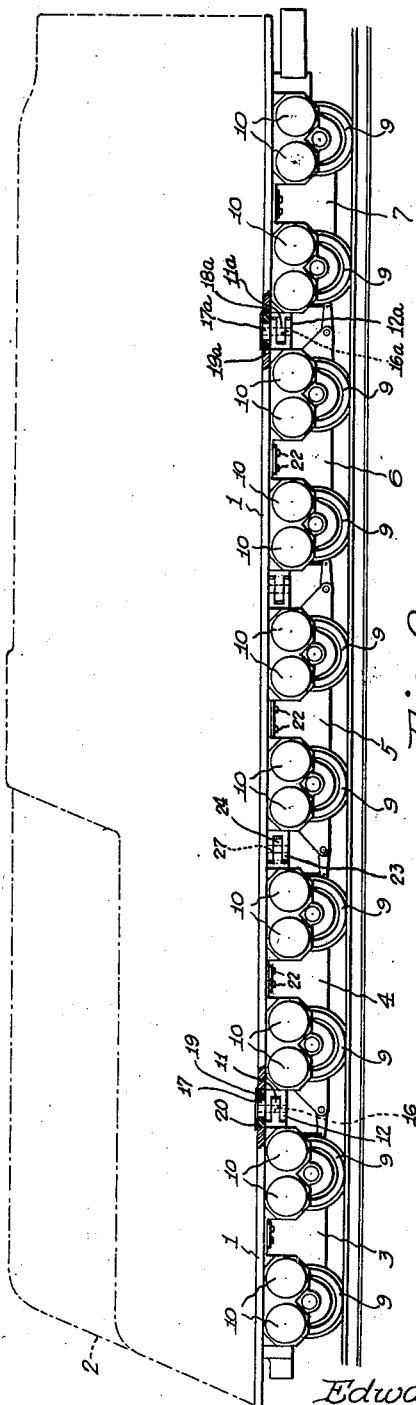
Inventor
Edward Gray,
Attorneys April 4, 1939.   E. GRAY   2,152,799
ARTICULATED RAILWAY TRUCK
Filed Feb. 8, 1937   2 Sheets-Sheet 2
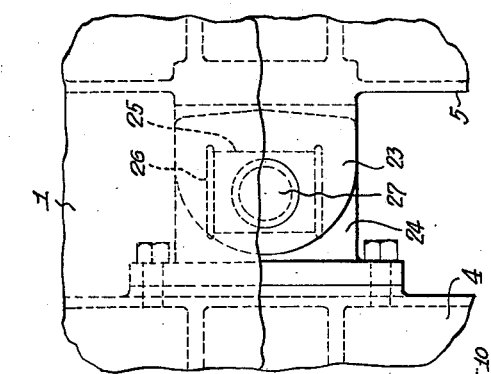
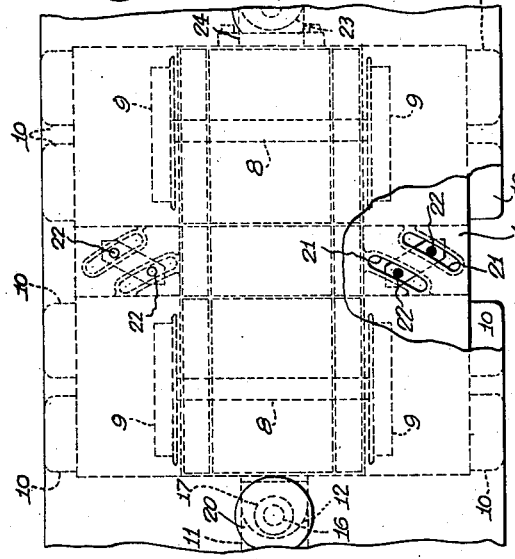
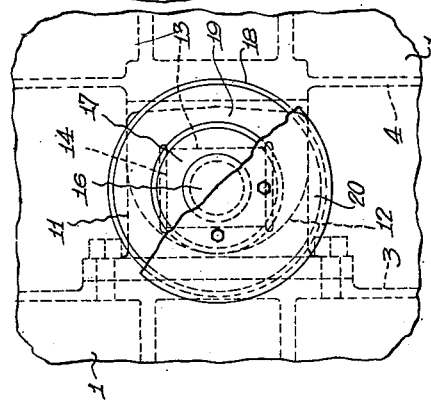
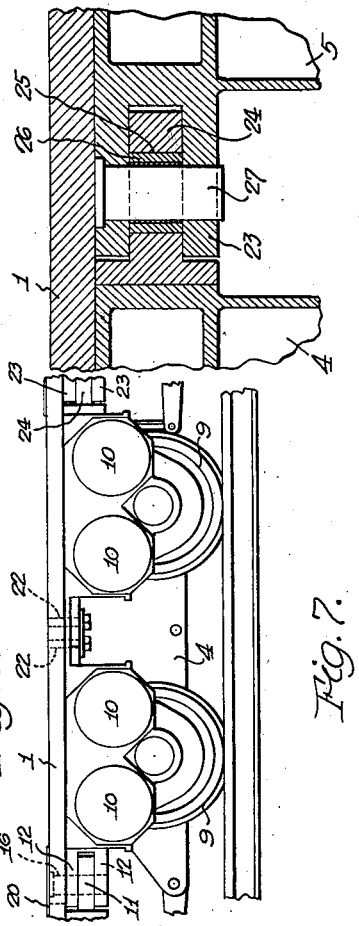
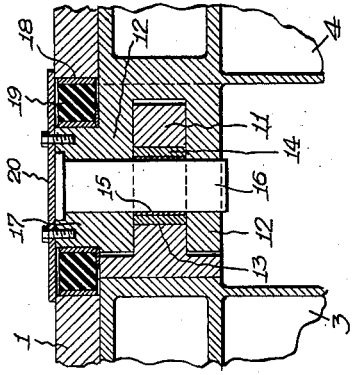
Inventor
Edward Gray,
By
Attorneys

Patented Apr. 4, 1939

2,152,799

UNITED STATES PATENT OFFICE 2,152,799

ARTICULATED RAILWAY TRUCK

Edward Gray, Detroit, Mich.

Application February 8, 1937, Serial No. 124,550

11 Claims. (Cl. 105—175)

The present invention relates to railway trucks, and more particularly to trucks designed for the support of locomotive bodies having means for supplying power to electric motors which operate to provide the torque necessary for rotating the drive wheels of the trucks. The means for supplying the power may be a power generating plant within the body or a trolley or collector for transmitting the power from trolley wires, third rails etc.

The primary object of the present invention is to provide a wheeled support for a locomotive or other rail vehicle body embodying a plurality of trucks, the trucks being relatively articulated and connected to the body in such manner that their relative positions may vary and conform to curves in the rails upon which they travel.

Another object of the present invention is to provide a wheeled support for locomotive bodies embodying a plurality of independently constructed trucks, the fore and aft trucks, supporting the fore and aft ends respectively of the locomotive body, being secured to a body supporting member in such manner that they may turn about vertical axes, and the remaining trucks being connected to the fore and aft trucks articulately and being unsecured with respect to the body supporting members. Furthermore, the means which secures the fore and aft trucks to the body supporting member is yieldable, preferably resiliently yieldable, so that their turning movement about vertical axes may be accompanied by any combination of lengthwise and lateral shifting movements relative to the member which supports the locomotive body. The yieldable means, in other words, permits the fore and aft trucks to be drawn together in order that all the trucks may follow curves in the rails they traverse.

With the above and other ends in view the invention is more fully disclosed with reference to the accompanying drawings, in which—

Figure 1 is a plan view of the unit for supporting a locomotive body;

Fig. 2 is a side elevation thereof, the locomotive body being shown thereon in chain lines;

Fig. 3 is a section taken on the line 3—3 of Fig. 1;

Fig. 4 is an enlarged plan of the detail shown in Fig. 3;

Fig. 5 is a section taken on the line 5—5 of Fig. 1;

Fig. 6 is a plan of the parts shown in Fig. 5;

Fig. 7 is an enlarged side elevation illustrating an articulate connection between trucks, and Fig. 8 is a plan of the detail shown in Fig. 7.

Like characters of reference are employed throughout to designate corresponding parts.

The numeral 1 designates a platform for supporting a locomotive body such as is indicated in chain lines at 2 in Fig. 2. Although it is not here illustrated for the reason that it forms no part of the invention and because it is already known to the art to which this invention pertains, the body 2 contains a power plant for generating electricity to supply the motors, to be hereinafter described, with the necessary torque to rotate the wheels of the trucks. The invention relates particularly to the construction of the trucks for supporting the platform and the means for connecting them with the platform 1.

The platform 1 rests upon the top of the frames of a plurality of trucks designated 3, 4, 5, 6 and 7. Each of the trucks has a pair of axles 8 with flanged wheels 9 on the ends thereof adapted to traverse rails. As is illustrated, housings 10 are supported by the trucks and although it is not here illustrated it will be understood that the housings 10 contain electric motors which are connected to respective axles to rotate the wheels thereon.

The two fore trucks 3 and 4 are connected together and to the fore part of the platform 1 by means shown more clearly in Figs. 3 and 4. Referring to these views, the numeral 11 designates a draw bar mounted upon the truck 3 and received in a forked draw bar 12 on the truck 4. As may be seen more clearly in Fig. 4 the draw bar 11 has a transversely extending slot 13, the side walls of which are parallel. Received in the slot 13 is a slidable block 14 having a bearing 15. A draw bolt 16 extends through the draw bar 12 and the bearing 15 to connect the two draw bars 11 and 12 together. It will be noted, however, that the length of the slot 13 is greater than the length of the slidable block and that lateral movement, to a limited extent, may take place between the draw bars 11 and 12.

The draw bar 12 has an annular formation 17, formed integral therewith coaxial with the draw bolt 16, the annular formation 17 extending vertically above the truck frame into an opening 18 in the platform 1. An annular elastic body 19, formed of material such as rubber, is interposed between the annular formation 17 and the wall of the opening 18 and yieldably holds the annular formation co-axial with the opening. A plate 20 is bolted to the annular formation 17 and bears upon the upper surface of the platform 1 to retain the annular formation 17 in the opening 18.

From the foregoing it becomes apparent that the two trucks 3 and 4 are articulately connected together and that both trucks may swing about the axis of the draw bolt 16. In order to restrict swinging movement of the trucks 3 and 4 with respect to the platform 1 they are each provided with arcuate slots 21 formed whereby their center of curvature coincides with the axis of the draw bolt 16. Rigid pins 22 are provided on the platform 1 and extend into the slots 21. The pins 22 in striking the ends of their respective slots 21 restrict the swinging movement of the trucks about the axis of the draw bolt 16. It will be noted, however, that the width of the slots 21 is greater than the diameter of the pins 22 so that the trucks 3 and 4 may shift with respect to the platform 1 in the direction of the length thereof. Such lengthwise shifting of the trucks is permitted by the compressible cushion member 19.

The two aft trucks 6 and 7 are connected together and to the platform 1 in a manner similar to that described above with reference to the trucks 3 and 4. The truck 7 has a draw bar 11a which is received in a forked draw bar 12a on the truck 6 and secured therein by a draw bolt 16a in a manner identical to that described above with reference to the draw bolt 16. The draw bolt 16a is provided with an annular extension 17a co-axial with the bolt 16a and received in a resilient body 19a in an opening 18a in the platform 1 and retained therein by a plate 20a. Swinging movement of the trucks 5 and 6 about the axis of the draw bolt 16a is restricted by the ends of slots 21a which are engaged by pins 22a carried by the platform. As in the case described above, the pins are smaller in diameter than the width of the slots so that the trucks 6 and 7 may shift lengthwise with respect to the platform 1.

The truck 5 is articulately connected at its front end to the truck 4 and at its rear end to the truck 6. The means for connecting the trucks is shown more clearly in Figs. 5 and 6 and comprises a forked draw bar 23 at each end thereof receiving a draw bar 24 which is mounted on the truck 4 or the truck 6, as the case may be. The draw bar 24 has a slot 25 supporting a bearing block 26 for lateral sliding movement. A draw bolt 27 extends through the forked draw bar 23 and the bearing block 26 to connect the two draw bars 23 and 24 together.

The truck 5 is not connected to the platform 1 except by the free connection therebetween which is furnished by the slotted engagement of pins and slots 28 and 29, respectively, said pins being secured to the platform, and said slots being formed in the truck. Such slotted engagement permits the truck 5 to shift laterally with respect to the platform 1, slots 29 providing the guiding of said truck during said lateral movement, and there being more than one pin and one slot to prevent pivotal movement of the truck 5.

From the foregoing it becomes apparent that the fore trucks 3 and 4 may swing about the axis of the draw bolt 16, the aft trucks 6 and 7 may swing about the axis of the draw bolt 16a, and the truck 5 may shift laterally with respect to the platform 1. These movements permit the several trucks to follow a curve in the rails they traverse, and when such movements take place the tendency is for the draw bolts 16 and 16a to be drawn together. The draw bolts 16 and 16a may be drawn together by compressing the rubber cushions 19 and 19a. Movement of the trucks 3 and 4, and 6 and 7, which accompanies movement of the draw bolts is permitted by forming the pins 22 and 22a of smaller diameter than the width of the slots 21 and 21a.

Although a specific embodiment of the invention has been illustrated and described it will be understood that various changes may be made within the scope of the appended claims without departing from the spirit of the invention, and such changes are contemplated.

What I claim is:

1. In combination, a member adapted to support a locomotive body, a plurality of wheeled trucks for supporting said member, there being two fore and two aft trucks, the two fore trucks being secured to said member at a point therebetween for movement with respect thereto about a vertical axis, the two aft trucks being connected to said member at a point therebetween for movement about a vertical axis, and a truck between the fore and aft trucks and articulately connected to the innermost of the fore and aft trucks respectively.

2. In combination, a member adapted to support a locomotive body, a plurality of wheeled trucks for supporting said member, there being two fore trucks and two aft trucks, means securing said two fore trucks and means securing said two aft trucks to said member for movement about vertical axes, said means being disposed between the two fore trucks and the two aft trucks respectively, said means permitting shifting of the axes of said swinging movement in a given plane, and a truck between the fore and aft trucks articulately connected to the innermost of the fore and aft trucks respectively.

3. In combination, a member adapted to support a locomotive body, a plurality of wheeled trucks for supporting said member, there being two fore trucks and two aft trucks, the two fore trucks being secured to said member at a point therebetween for movement with respect thereto about a vertical axis, the two aft trucks being connected to said member at a point therebetween for movement about a vertical axis, and a truck between the fore and aft trucks and articulately connected to the innermost of the fore and aft trucks, said last named truck being shiftably supported by said body supporting member.

4. In combination, a member adapted to support a locomotive body, a plurality of wheeled trucks for supporting said member, there being two fore and two aft trucks, means securing said two fore trucks and means securing said two aft trucks to said member for movement about vertical axes, said means being disposed between the two fore trucks and the two aft trucks respectively, said means permitting shifting of the axes of said swinging movement toward and away from each other, and a truck between the fore and aft trucks articulately connected to the innermost fore truck and aft truck respectively, said last named truck being shiftably supported by said body supporting member.

5. In combination, a member adapted to support a locomotive body, a plurality of wheeled trucks for supporting said member, there being two fore trucks and two aft trucks, means securing said two fore trucks and means securing said two aft trucks to said member for movement about vertical axes, said means being disposed between the two fore trucks and the two aft trucks respectively, said means permitting shifting of the axes of said swinging movement toward and away from each other and having resilient means yieldably opposing such movement, and a truck between the fore and aft trucks articulately connected to the innermost of the fore and aft trucks respectively.

6. In combination, a member adapted to support a locomotive body, a plurality of wheeled trucks having surfaces upon which said member rests for supporting the same, means articulately connecting said trucks together, and yieldable means independent of said supporting surfaces connecting the fore and aft trucks to said member for permitting relative horizontal shifting of said trucks with respect to said member.

7. In combination, a member adapted to support a locomotive body, a plurality of wheeled trucks for supporting said member, means articulately connecting said trucks together, and each of the articulate connections between the two fore trucks and the two aft trucks engaging said member and connecting said trucks with said member for swinging movement about vertical axes and horizontal shifting movement relative to said member.

8. In combination, a member adapted to support a locomotive body, a plurality of wheeled trucks for supporting said member, means articulately connecting said trucks together, and each of the articulate connections between the two fore trucks and the two aft trucks engaging said member and connecting said trucks with said member for swinging movement about vertical axes and horizontal shifting movement relative to said member and comprising the sole connections between the plurality of trucks and said body supporting member.

9. In combination, a member adapted to support a locomotive body, a plurality of wheeled trucks for supporting said member, articulate connections between the several trucks, some of said trucks being connected to said member at points co-axial with their articulate connections for movement about vertical axes, and the remainder being freely supported by said member for lateral movement with respect to said member.

10. In combination, a member adapted for the support of a locomotive body, trucks for supporting said member, means articulately connecting said trucks together, and means co-axial with certain of said articulate connections for connecting said trucks with said member for movement about vertical axes, said last named means having resiliently yieldable means adapted to be distorted under pressure to permit shifting of said axes with respect to said member.

11. In combination, a member adapted for the support of a locomotive body, trucks for supporting said member, means articulately connecting said trucks together, and means co-axial with certain of said articulate connections for connecting said trucks with said member for movement about vertical axes, said last named means adapted to be distorted under pressure to permit shifting of said axes with respect to said member.

EDWARD GRAY.